R. H. DENMAN.
CAMERA AND INSTRUMENT SUPPORT.
APPLICATION FILED MAR. 31, 1915.
1,170,422.
Patented Feb. 1, 1916.
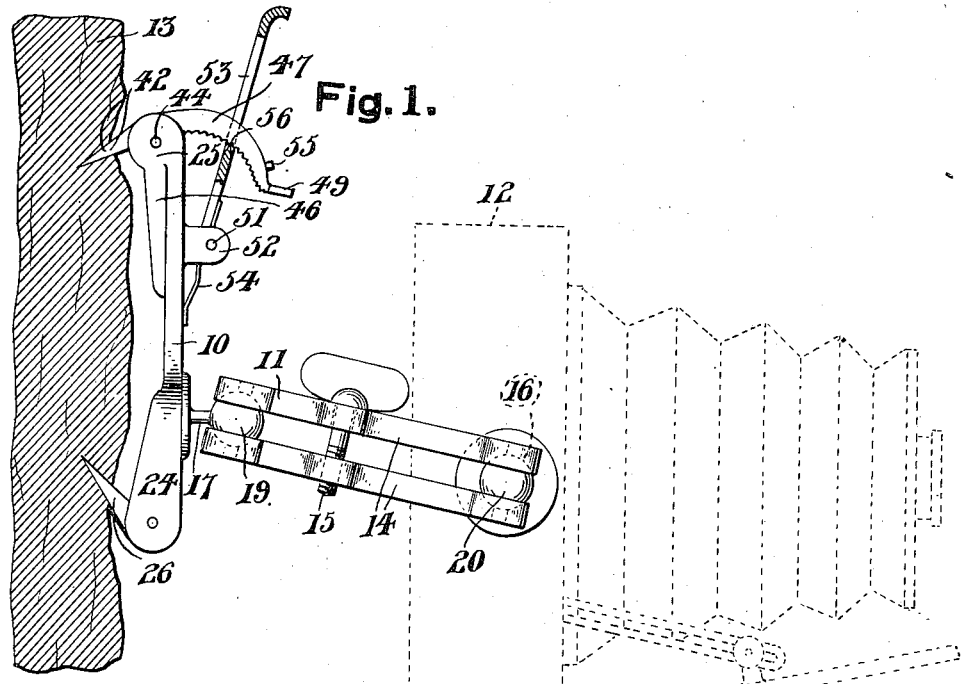
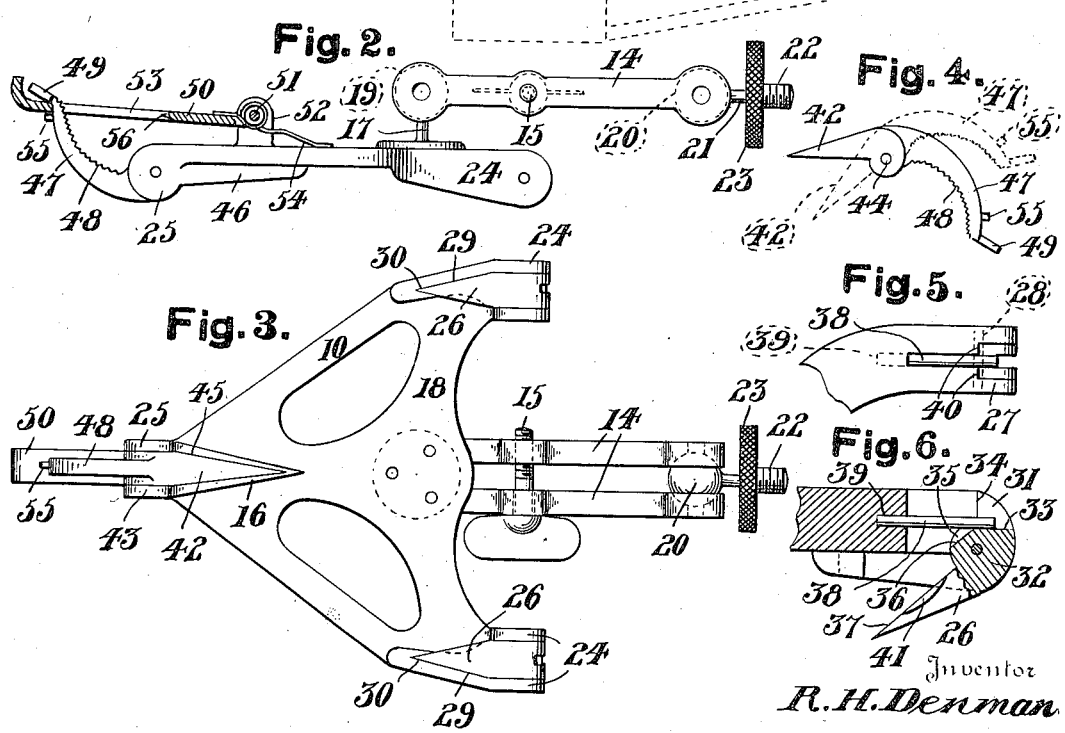
Inventor
R. H. Denman
By T. R. Bryant
Attorney

UNITED STATES PATENT OFFICE.

RALPH H. DENMAN, OF ITHACA, NEW YORK.

CAMERA AND INSTRUMENT SUPPORT.

1,170,422.      Specification of Letters Patent.      Patented Feb. 1, 1916.

Application filed March 31, 1915. Serial No. 18,337.

*To all whom it may concern:*

Be it known that I, RALPH H. DENMAN, a citizen of the United States, residing at Ithaca, in the county of Tompkins and State of New York, have invented certain new and useful Improvements in Camera and Instrument Supports, of which the following is a specification.

This invention relates to certain new and useful improvements in camera and instrument supports.

The primary object of this invention is to provide a foldable support especially adapted as a mounting means for cameras although equally serviceable in connection with compasses, transits, levels, and other instruments and whereby the same may be firmly mounted for use and readily adjusted in position.

A further object is to provide an adjustable mounting support adapted for resting upon plane or polished surfaces and having foldable locking engaging claws whereby the device may be firmly attached to any stationary wooden support such as a building, tree, or fence.

A still further object of the invention is to provide a foldable support which may be readily carried in the pocket and to which a camera or instrument is readily attached for adjustable positioning, the device being capable of either resting of its own weight upon any stationary object or locked in a rigid engagement therewith.

With these general objects in view and others that will appear as the nature of the invention is better understood, the same consists in the novel combination and arrangement of parts hereinafter more fully described, illustrated in the accompanying drawings, and pointed out in the appended claims.

In the drawings, forming a part of this application and in which like-designating characters refer to corresponding parts throughout the several views:—Figure 1 is a side elevation of the device operatively positioned in locked engagement with a wooden support and with a camera which is illustrated in dotted lines mounted in use thereon. Fig. 2 is a side elevation of the device detached and in its closed position, the locking lever being shown in central longitudinal section. Fig. 3 is a bottom plan view thereof. Fig. 4 is a side elevation of the locking claw detached, its shifted position being shown in dotted lines. Fig. 5 is a top plan view of one of the claw carried feet of the device, and Fig. 6 is an enlarged detail view thereof partially in section.

Referring more in detail to the drawings, the invention broadly consists of a substantially triangular shaped base 10 having an adjustable clamp 11 mounted thereon for adjustable attachment to a device such as a camera 12 and whereby the same may be mounted for use upon a stationary support and may be locked to any upright wooden member 13 as illustrated in Fig. 1 of the drawings. The base 10 may be formed of any desired material, preferably of some material which is light in weight, such as aluminum.

One face of the base 10 has the clamp 11 adjustably attached thereto, the said clamp being formed of two parallel bars 14 connected by a clamping screw 15 and having tapered sockets or recesses 16 upon the opposite inner faces of the ends of the said bars. A post 17 is fixedly secured to the base 10 and adjacent the side 18 thereof which corresponds to the base of the triangle. A ball 19 arranged at the free end of the post 17 is seated within the bar sockets 16 at one end of the clamp, while a similar ball 20 is maintained within the sockets 16 at the opposite end of the clamp, the said ball 20 having a post 21 secured thereto terminating in a screw 22 adapted for attachment with an instrument or a camera and capable of being turned by means of a peripherally knurled finger disk 23.

The base member 10 is provided on the face thereof opposite the said clamp with feet 24 and 25 arranged at each of the three corners of the base. It will thus be seen that with the device folded as shown in Fig. 2, a camera or instrument may be readily attached to the clamp 11 and the said clamp adjusted in substantially vertical position and whereupon the base 10 may be positioned with its feet 24 and 25 mounted upon any stationary object and thus affording a serviceable adjustable support. The said feet 24 are arranged oppositely at the ends of the side 18 being at the base corners of the member 10, while the foot 25 is arranged upon the member 10 at a point corresponding to the apex of the triangle. An engaging claw 26 being pointed and substantially rectangular in cross section is pivoted in each of the feet 24 within an end recess 27 thereof and upon a transverse pin 28. The lower side of each foot 24 has a receiving socket 29 therein adapted for inclosing the adjacent claw 26 when the latter is in its closed position, it being noted that one end of each socket 29 is tapered as at 30 for receiving the point of the adjacent claw which prevents the claw from projecting outwardly of the foot when the claw is closed and allowing the base to be positioned upon polished surfaces without marring the same. Each of the claws 26 is provided with a slot 31 at one side of the pivoted hub 32 thereof and is provided with its bottom 33 extending in a plane perpendicular to the inner end face 34 of the claw. The hub 32 is also provided with a registering side slot 35 which has its bottom 36 positioned in a plane parallel to that of the inner face 37 of the said claw 26. A resilient bar spring 38 is maintained with one end in a socket 39 of the foot and having its other end positioned against the adjacent side of the claw hub 32, the said spring being engaged with the slot bottom 36 when the claw is in its closed position and with the slot bottom 32 when the claw is open with the portions 31 thereof in abutting engagement with the opposite shoulders 40 of the foot, and at which latter time the claw will be positioned out of its foot socket 29 and extending at an acute angle to the adjacent face of the base 10.

It will be noted that while the feet sockets 29 retain the claws 26 inclosed therein when the claws are folded, that the claws may be readily opened by engaging the cut-away fingernail receiving socket 41 and the claw may be readily snapped to its open position, the movement thereof being limited by the said shoulders 40.

The foot 25 of the base is provided with a locking claw 42 pivotally mounted in the opposite spaced portions or sides 43 of which the foot 25 consists and by means of a transverse pivot pin 44. A V-shaped recess 45 is provided in a correspondingly shaped rib 46 upon the base 10 and adjacent the foot 25 thereof and adapted for receiving the claw 42 in its folded position.

The claw 42 is provided with an arcuate extension 47 which is provided with a toothed cam surface 48 upon its inner side and terminates in a cross head 49. An operating lever 50 is provided for the locking claw 42 and is pivotally mounted upon a pin 51 extending between opposite lugs 52 arranged in a line between the point of attachment of the post 17 with the base 10 and the apex thereof. This lever 50 has a longitudinal slot 53 therethrough adapted to accommodate the locking claw extension 47 as shown in Figs. 1 and 2 of the drawings.

A spring 54 is provided for the lever 50 and resiliently moves the said lever toward the locking claw pivot 44, while a pin 55 carried by the outer side of the locking claw extension 47 slightly spaced from the extension end 49 receives the locking lever resiliently held thereagainst by the said spring 54 when the claw 42 is seated within its recess 45.

From this detailed description of the invention, the manner of attaching the base 10 to a wooden support will be evident from Fig. 1 of the drawings. With the device positioned as shown in Fig. 2, the claws 26 are moved outwardly and are forcibly projected at an inclination into the wooden support 13, while the locking claw 42 is moved outwardly so as to extend substantially at right-angles to the base 10 it being understood that the extension 47 is released from the locking lever 50, and that the said claw 42 is actuated by moving the extension 47. The said locking claw 42 is then forced into the wood 13 and forcibly rocked upon its pivot 44 by pressure upon the head 49, and the toothed cam 48 of the extension being in engagement with the locking lever tooth 56 at the inner end of the slot 53, a forcible movement of the locking lever upon its pivot 51 and in a direction away from the base 10 results in passing and ratcheting the tooth 56 over the toothed cam 48 thus forcing the claw 42 which is within the wood in a direction toward the claws 26 and also draws the said claws 26 more firmly into the wood, thus locking all of the claws in the wood and firmly mounting the base 10 thereon. It will be seen that this engagement of the tooth 56 with the extension cam will remain until it is desired to release the base from the wood support 13, when the locking lever will be forcibly moved toward the base 10 to its releasing position and at which time all of the claws may be removed from the wood 13 and may be folded into their respective base recesses.

The device is of sufficient strength to support the desired instruments or camera and is of small size so that when folded it may be readily carried in the pocket and is then ready for immediate use for employment after the manner of a tripod, and for holding the camera or instrument in any desired adjusted position for use.

While the form of the invention herein shown and described is what is believed to be the preferred embodiment thereof, it is nevertheless to be understood that minor changes may be made without departing from the spirit and scope of the invention as claimed.

What I claim as new is:

1. A support comprising a base, an adjustable clamp mounted thereon, claws pivoted to the said base, a locking claw carried by the said base, and a locking lever for the said claw, the said base being provided with claw-receiving recesses.

2. A support comprising a base provided with socketed feet at the corners thereof, foldable engaging claws pivoted to the said feet, an operating extension carried by one of the said claws, and a claw-locking lever pivoted to the said base and adapted for operative engagement with the said extension.

3. A support comprising a triangular-shaped base, a mounting clamp upon one side thereof, a locking lever pivoted to the said side of said base and provided with a longitudinal slot therethrough, foldable claws pivoted to the said base at the corners thereof and positioned upon the opposite side of the said base from the said clamp, a curved extension carried by one of said claws and extending through the said lever slot, the said extension and lever having coöperating ratchet teeth.

4. A support comprising a triangular-shaped base, a mounting clamp upon one side thereof, a locking lever pivoted to the said side of said base and provided with a longitudinal slot therethrough, foldable claws pivoted to the said base at the corners thereof and positioned upon the opposite side of the said base from the said clamp, a lever extension carried by one of said claws and extending through the said lever slot, the said extension and lever having coöperating ratchet teeth, a terminal cross-head at the free end of the said extension, a stop pin upon the outer face of the said extension spaced from the said cross-head, the said base having claw receiving sockets and the said locking lever being positioned between the said cross head and pin when its claw is in its closed position.

5. A support comprising a base, engaging claws carried by the said base, a movable locking claw carried by the said base, and a locking lever for the said locking claw.

6. A device of the class described comprising a triangular base having pointed recesses adjacent the corners thereof and upon one face of the said base, claws pivoted to the corners of the said base and seated within the said recesses when in their closed positions, and resilient positioning springs for two of the said claws.

7. A device of the class described comprising a triangular base having pointed recesses adjacent the corners thereof and upon one face of the said base, claws pivoted to the corners of the said base and seated within the said recesses when in their closed positions, resilient positioning springs for two of the said claws, a curved operating extension carried by the other of said claws having a toothed cam surface upon its inner side, and an operating locking lever for the said extension.

8. A device of the class described comprising a triangular base having pointed recesses adjacent the corners thereof and upon one face of the said base, claws pivoted to the corners of the said base, and seated within the said recesses when in their closed positions, resilient positioning springs for two of the said claws, a curved operating extension carried by the other of said claws having a toothed cam surface upon its inner side, a terminal cross-head and stop pin carried by the said extension, and a locking lever pivoted to the said base and provided with a longitudinal slot through which the said extension is positioned.

9. A device of the class described comprising a triangular base having pointed recesses adjacent the corners thereof and upon one face of the said base, claws pivoted to the corners of the said base and seated within the said recesses when in their closed positions, resilient positioning springs for two of the said claws, a curved operating extension carried by the other of said claws having a toothed cam surface upon its inner side, a terminal cross-head and stop pin carried by the said extension, a locking lever pivoted to the said base and provided with a longitudinal slot through which the said extension is positioned, a tooth provided upon said lever at one end of the slot therein and being oppositely positioned with respect to the said cam face, the said lever being engaged at the opposite end of said slot from the said tooth between the said cross-head and pin when the device is in its folded position.

10. A support comprising a triangular base, an adjustable mounting clamp upon one face thereof, supporting feet at each corner of the base upon the opposite side thereof from the said clamp, angularly positionable claws pivoted to the said feet, an operating extension upon one of said claws having a toothed cam surface upon one side thereof, a locking lever pivoted to said base and provided with a ratchet tooth in resilient engagement with the teeth of the said cam when the base is operatively arranged in its locked position.

In testimony whereof I affix my signature.

RALPH H. DENMAN.